Sept. 7, 1943.	H. J. MOON ET AL	2,328,833
COVER OPERATING DEVICE FOR ELECTRIC ROASTERS
Filed Sept. 12, 1940	4 Sheets-Sheet 1
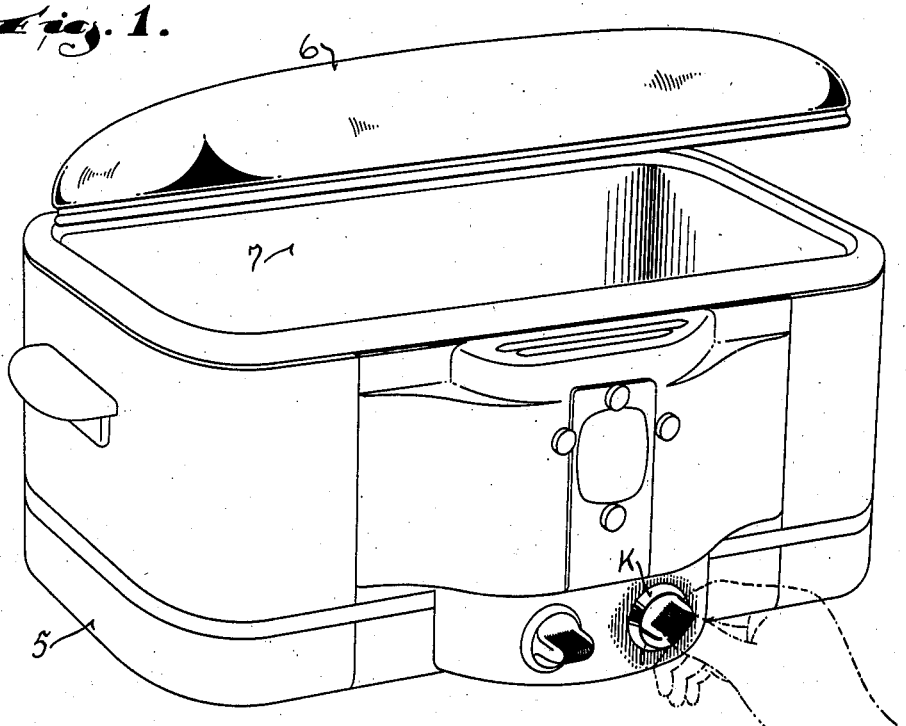
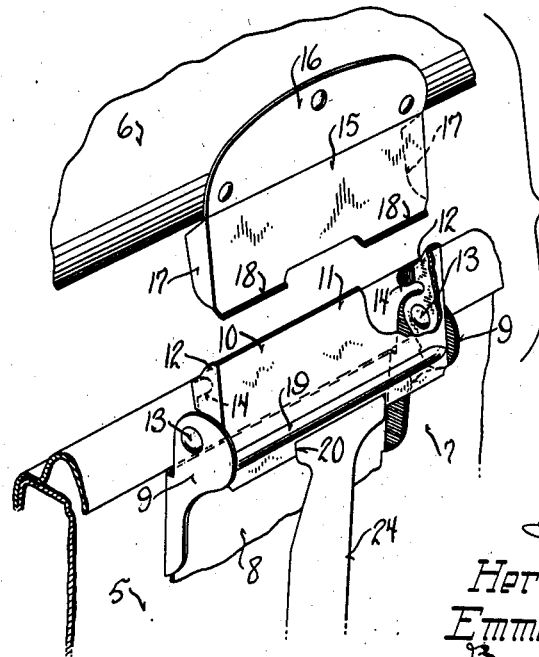
Inventors
Herbert J. Moon
Emmet G. Gardner Sept. 7, 1943.  H. J. MOON ET AL  2,328,833
COVER OPERATING DEVICE FOR ELECTRIC ROASTERS
Filed Sept. 12, 1940   4 Sheets-Sheet 2
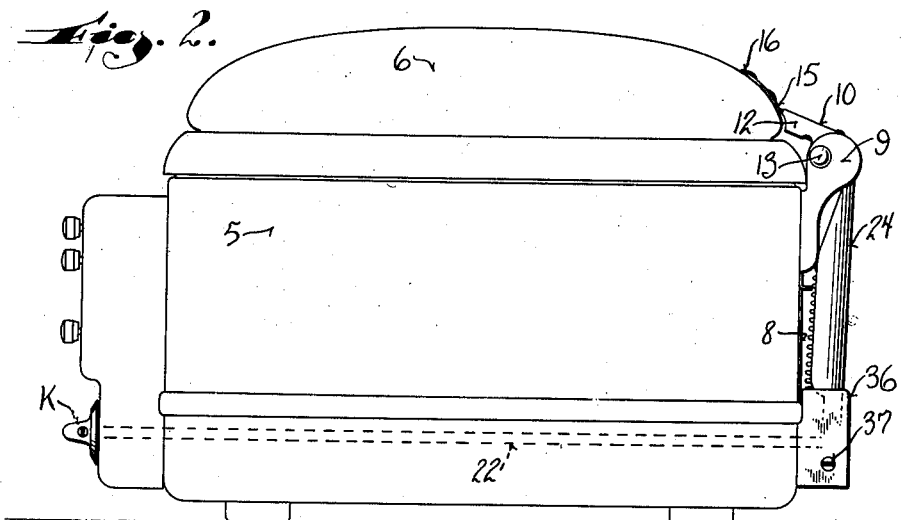
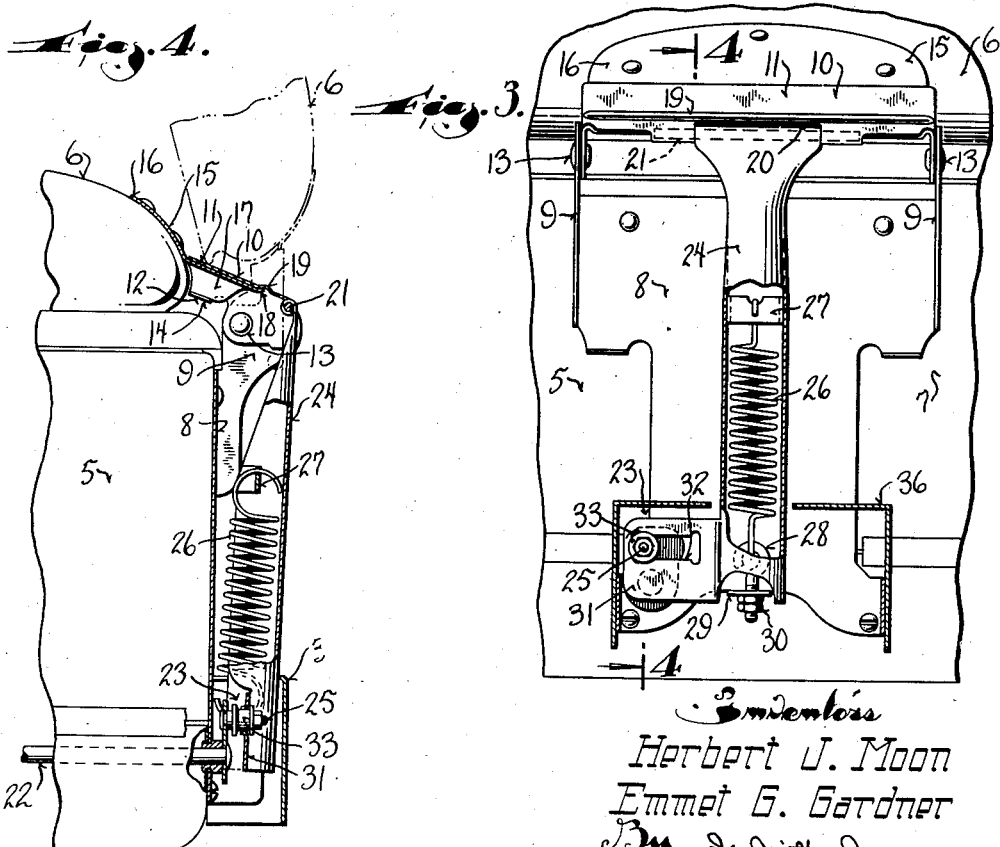
Inventors
Herbert J. Moon
Emmet G. Gardner Sept. 7, 1943.   H. J. MOON ET AL   2,328,833
COVER OPERATING DEVICE FOR ELECTRIC ROASTERS
Filed Sept. 12, 1940   4 Sheets-Sheet 3

Inventors
Herbert J. Moon
Emmet G. Gardner
By
Attorney

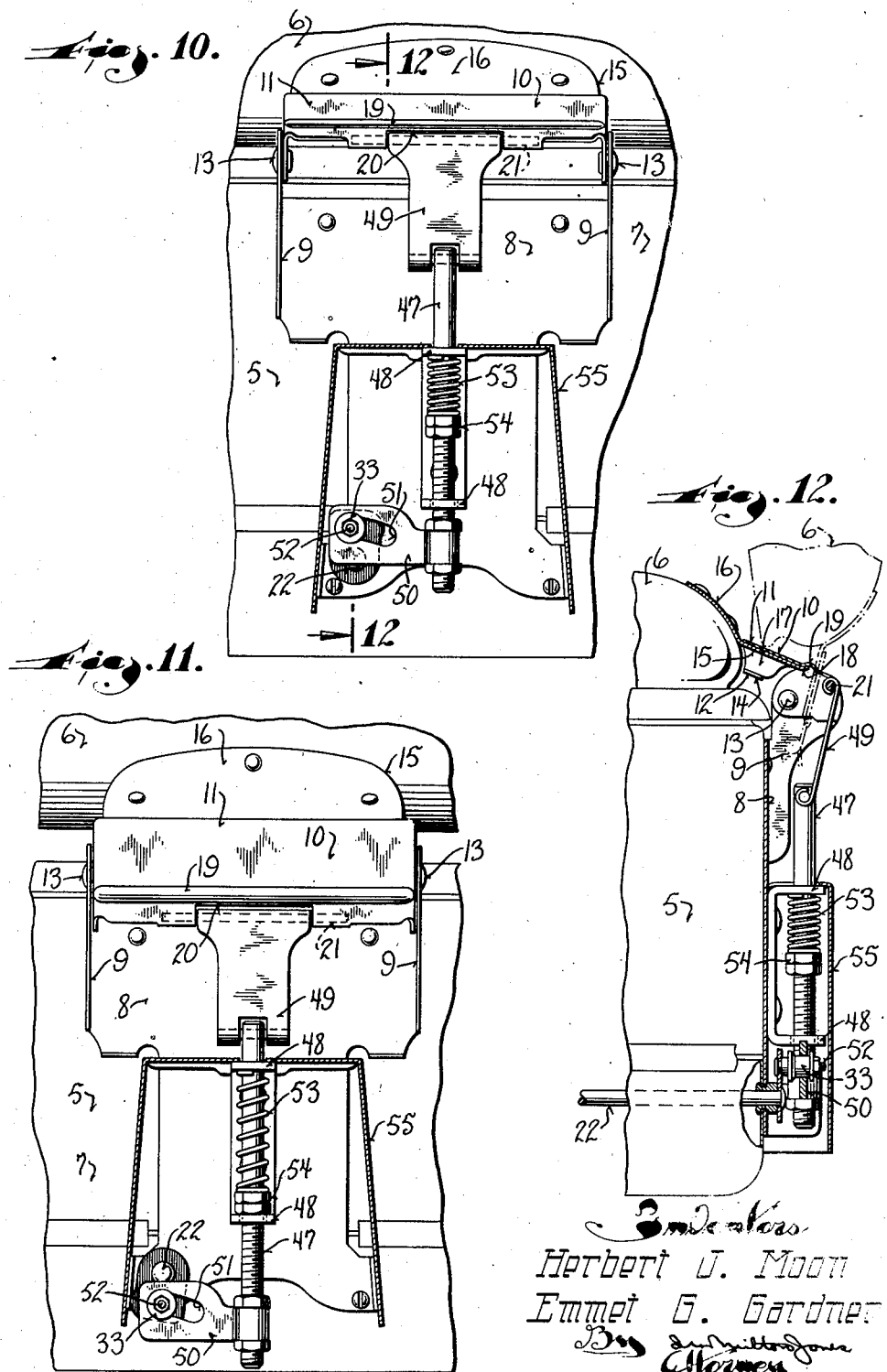

Patented Sept. 7, 1943

2,328,833

UNITED STATES PATENT OFFICE 2,328,833

COVER OPERATING DEVICE FOR ELECTRIC ROASTERS

Herbert J. Moon, St. Louis, Mo., and Emmet G. Gardner, Milwaukee, Wis., assignors to National Enameling & Stamping Company, Milwaukee, Wis., a corporation of New Jersey Application September 12, 1940, Serial No. 356,422

9 Claims. (Cl. 220—36)

This invention relates to cooking appliances, or to electric roasters as they are more commonly known, and refers particularly to mechanism for opening and closing the cover thereof.

An electric roaster, as is well known, consists of a heavily insulated receptacle having electric heating elements in the walls thereof, and having a removable cover closing its open top.

Originally the cover consisted of an ordinary lid with a handle, but as the development of electric roasters progressed, the cover was hinged to the rear wall of the receptacle and a handle was attached to its front portion to facilitate lifting it open. This arrangement subjected the hand and arm of the housewife to the steam escaping from the interior of the receptacle the instant the cover was slightly lifted, and with this objection in mind, the present invention has as its primary object to provide means for raising and lowering the hinged cover from a point beneath the open top of the receptacle, and in a sense remote from the cover so as to obviate the objectionable necessity of subjecting the housewife to the inconvenience of directly lifting the cover.

More specifically, it is an object of this invention to provide cover raising and lowering means which includes an actuator passing through the lower portion of the receptacle from front to rear and which is operatively connected to the cover exteriorly of the rear wall of the receptacle.

Another object of this invention is to provide an effective and simple manner of detachably connecting the cover to a hinged supporting member so that while the cover may be quickly removed for cleaning it is securely held against accidental detachment when in use.

Another object of this invention is to provide a cover counterbalancing spring and to utilize the spring through slight over-travel of the actuator to hold the cover against opening except by means of its actuator.

In this connection, it is a further object of the present invention to so construct the cover opening and closing mechanism that the parts thereof themselves constitute the stop for the cover closing motion of the actuator.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is a perspective view of an electric roaster embodying this invention;

Figure 2 is an end view thereof;

Figure 3 is an enlarged detail view showing the cover operating mechanism in rear elevation, part of the structure being broken away and in section;

Figure 4 is a detail sectional view through Figure 3 on the plane of the line 4—4, but showing the receptacle and cover of the roaster in elevation;

Figure 5 is a perspective view of the parts which constitute the detachable cover support;

Figure 10 is a view similar to Figure 3 showing another modified embodiment of the invention and showing the cover closed;

Figure 11 is a view similar to Figure 10 but showing the parts in their positions with the cover open; and Figure 12 is a sectional view similar to Figure 4, but taken on the plane of the line 12—12 in Figure 10.

Figure 6:
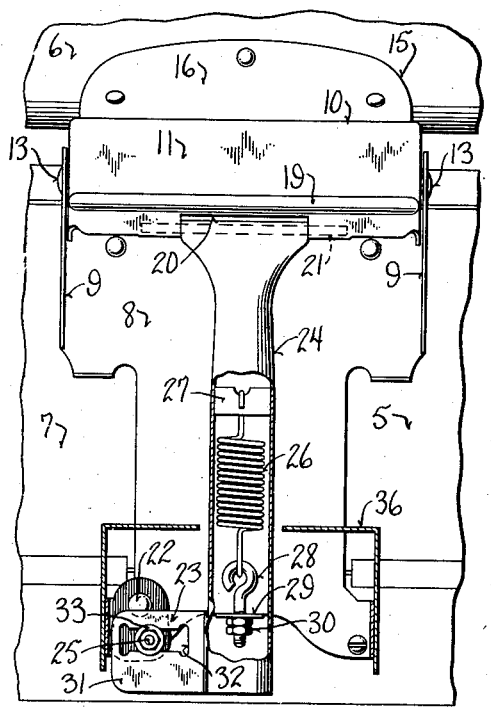
Figure 6 is a view similar to Figure 4 but showing the parts in their positions when the the cover is open.

Referring now particularly to the accompanying drawings, in which like numerals indicate like parts, the numeral 5 designates the receptacle of a cooking appliance or electric roaster which, as is customary, has an open top adapted to be closed by a cover 6. The walls of the receptacle are heavily insulated and contain electric heating elements (not shown).

The cover 6 is shaped to fit into the shouldered edge of the open top of the receptacle when closed and is hingedly mounted from its rear wall 7.

The hinged mounting of the cover comprises a bracket 8 fixed to the exterior of the rear wall 7 and having outwardly extending side flanges 9 which project slightly above the top of the receptacle.

Mounted between the side flanges 9 is a cover support 10 in the form of a sheet metal stamping having a substantially flat medial wall 11 and flanges 12 at its opposite ends.

The length of the cover support 10 is such that its end flanges 12 just fit between the side flanges 9 to which they are hingedly secured by pins or rivets 13.

Projecting inwardly from the front edges of the end flanges 12 are tongues 14 which cooperate with the adjacent portions of the medial wall 11 to form guideways for the reception of a projection 15 extending from the rear portion of the cover.

The projection 15 is part of a sheet metal stamping, the remainder of which comprises a lip 16 secured to the cover. The projection proper is a substantially flat wall approximately coextensive in area with the medial wall 11 of the cover support, with end flanges 17 extending inwardly from its opposite edges.

These flanges 17 are tapered and engage in the guideways formed by the tongues 14 and the medial wall 11 substantially with a wedge-like action, thus readily detachably connecting the cover to the support 10.

To prevent accidental detachment of the cover, the outer edge of its projection is turned outwardly as at 18 to snap into a groove 19 formed by pressing a bead into the medial wall 11 of the cover support as the cover is placed in position.

The rear edge of the hinged cover support 10 has a central notch 20 of substantial length and its portions at opposite sides of the notch are looped about a hinge pintle 21 which extends across the notch 20, and as will be readily apparent is spaced outwardly or rearwardly from the axis of the cover hinge. Consequently, a downward pull on the hinge pintle 21 lifts the cover.

To the extent thus far described, all of the several embodiments of the invention herein-disclosed are alike. The specific manner in which the cover opening and closing movement is imparted to the hinged cover support varies except that in each instance a rotatable actuating shaft 22 extends through the lower part of the receptacle from front to back, the front end of which has a knob K secured thereto and the rear end of which has a crank indicated generally by the numeral 23 fixed thereto, and in each case the pin of the crank is connected with the pintle 21 so that rotation of the shaft transmits motion to the cover.

In that embodiment of the invention shown in Figures 1 to 6, inclusive, a link 24 connects the pintle 21 with the crank pin 25. The upper end of the link is pivotally secured to the pintle 21 in a manner constraining it to pivotal motion about the pintle.

The link is stamped from sheet metal and has a substantially channel shaped cross section throughout the major portion of its length so as to embrace and cover a counterbalancing spring 26. The upper end of the spring is hooked onto a cross bar 27 on the link and its lower end is anchored to an adjustable support 28.

For convenience, the support 28 is in the form of a screw-eye and passes through a hole in a rearwardly projecting flange 29 at the bottom of the bracket 8 where it is adjustably secured by jam nuts 30.

At one side, the lower portion of the link has an arm 31 projecting laterally therefrom. This arm is preferably an integral part of the link and has a slot 32 therein to receive the crank pin 25.

A roller 33 on the pin facilitates relative motion between the crank pin and the edges of the slot.

The relationship of the parts is such that rotation of the shaft 22 in one direction pulls on the link 24 to swing the cover from its closed position shown in Figure 3 to an open position shown in Figure 6, this action being facilitated by the tension of the counterbalancing spring, as will be readily apparent. Opposite rotation of the crank shaft raises the link to close the cover and, as clearly shown in Figure 3, the crank pin travels a slight distance across dead center during the cover closing motion to the limit of its travel, defined by the engagement of the roller with the end of the slot 32.

By virtue of the crank pin crossing dead center in this manner the tension of the spring is utilized to hold the cover closed against opening except by actuation of the knob K.

The lower end of the link, as well as the rear end of the crank shaft and the associated mechanism, is enclosed and concealed from view by a housing 36 secured in place in any suitable manner as by screws 37.

Figure 7:
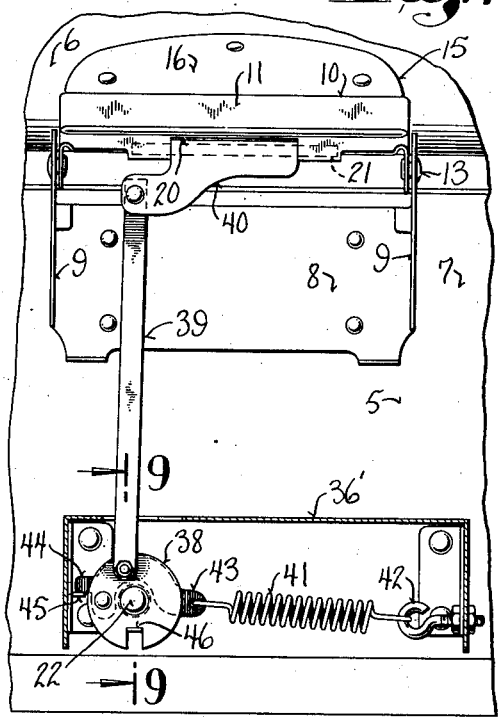
Figure 7 is a view similar to Figure 4 showing a slightly modified embodiment of the invention.
Figure 8:
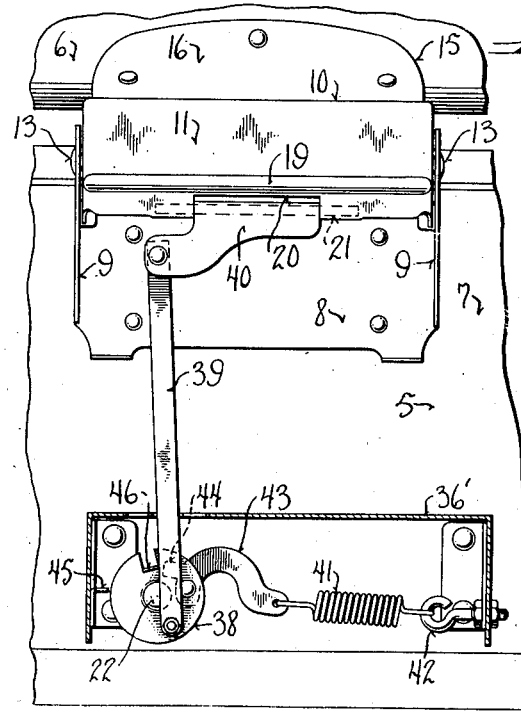
Figure 8 is a view similar to Figure 7 showing the parts in their positions when the cover is open.
Figure 9:
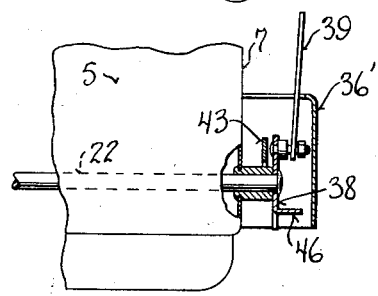
Figure 9 is a detail sectional view through Figure 7 on the plane of the line 9—9.

In that form of the invention illustrated in Figures 7, 8 and 9, the crank shaft has a disc 38 fixed to its rear end which is equivalent to the crank 23, and attached to this disc is a link 39, the upper end of which is pivotally connected to a stamping 40 hinged to the pintle bar 21.

The counterbalancing spring in this case is enclosed within the housing 36' and consists of a conventional coil spring 41 having one end anchored to an adjustable support 42 and its other end connected to an arched link 43 the end of which is pivotally connected to the crank disc 38.

Upon rotation of the crank shaft to close the cover, the link swings across the crank shaft to its position shown in Figure 7, which position is defined by the engagement of a lug 44 on the link 43 striking a stop 45.

In this position of the parts the line of spring force is slightly below the center of the crank shaft so that the parts are beyond dead center for the purpose of holding the cover against opening except by actuation of the crank shaft.

Opening movement of the mechanism in this case is limited by a stop lug 46 extending from the crank disc and engaging the side edge of the link 39 as clearly shown in Figure 8.

In that form of the invention shown in Figures 10 to 12, inclusive, the cover opening and closing motion of the crank shaft is transmitted to the cover through a rod 47 slidably mounted on the back wall of the receptacle. Two spaced bearings formed by holes in rearwardly extending projections 48 formed by the ends of a U-shaped strap riveted to the rear wall of the receptacle, slidably mount the rod. These bearings are axially aligned on a vertical axis to constrain the rod 47 to longitudinal vertical endwise motion.

The upper end of the rod is connected by means of a link 49 to the pintle 21 and the lower end thereof has a laterally projecting arm 50 similar to the arm 31. An elongated slot 51 in the arm 50 has the crank pin 52 received therein, so that by rotation of the crank shaft, up and down motion may be transmitted to the spring rod 47.

The counterbalancing spring in this case is a compression spring 53 coiled about the rod and confined between the upper bearing 48 and an abutment on the rod formed by jam nuts 54.

As in the embodiments hereinbefore described, the cover closing motion carries the crank pin beyond dead center to a position limited by the engagement of the pin with the end of the slot 51 and, as in the other embodiments, the lower portion of the spring rod together with the crank and its connection to the rod are enclosed within a housing 55 fixed to the rear wall of the receptacle.

From the foregoing description, taken in connection with the accompanying drawings, it will be readily apparent that this invention provides a convenient, practical manner of opening and closing the cover of an electric roaster, and that it completely obviates the danger of burns resulting from escaping steam contacting the hands or arms of the housewife.

What we claim as our invention is:

1. In a cooking appliance having an open topped receptacle provided with a cover therefor: a bracket securable to the rear wall of the receptacle; a substantially U-shaped stamping having side flanges connected by an intervening web; a hinged connection between the side flanges of the stamping and said bracket; projections extending inwardly from the side flanges; a stamping securable to the cover and having a projection extending therefrom with flanges formed at the opposite ends thereof, said projection being of a length to fit between the side flanges of the hingedly mounted stamping, and the flanges on the cover stamping being shaped to engage between the projections on the side flanges of the hinged stamping and its web with a wedge-like action so that the cover is detachably connected with said hinged stamping; and cover actuating means connected with said hinged stamping on an axis spaced from the axis of its hinged connection to the bracket for raising and lowering the cover of the receptacle from a point remote from the hinge axis of the cover.

2. In a cooking appliance having an open topped receptacle provided with a cover therefor: a bracket securable to the back wall of the receptacle and having spaced side flanges; a cover support comprising a medial wall having side flanges projecting therefrom; means hingedly connecting the side flanges of said cover support to the side flanges of the bracket; instruck projections on the side flanges of the cover support overlying its medial wall and cooperating therewith to form guideways; a projection securable to the cover received in said guideways with a wedge-like action so that the cover is readily detachably connected to said cover support; a counterbalancing spring acting on the cover support to counterbalance the weight of the cover; and cover actuating means connected with said cover support on an axis spaced from the axis of its hinged connection to the bracket for raising and lowering the cover of the receptacle from a point remote from the hinge axis of the cover.

3. In a cooking appliance including an open topped receptacle having a cover therefor: a lever-like cover support hingedly mounted on the rear wall of the receptacle with one arm thereof extending forwardly of its hinge axis toward the cover and its other arm extending rearwardly of the hinge axis away from the cover; means connecting the forwardly projecting arm of the cover support with the cover, so that, oscillation of the cover support directly transmits opening and closing motion to the cover; a link hingedly connected to the rearwardly extending arm of the hinged cover support and constrained to hinge motion with respect to the cover support and about an axis parallel with the hinge axis of the cover support, said link extending downwardly across the rear wall of the receptacle so that a pull thereon rocks the cover support on its hinge to raise the cover; a rotatable shaft mounted in the lower portion of the receptacle and extending therethrough from front to back; crank means secured to the rear end of the shaft; a connection between said crank means and the lower end of the link, the length of the link being such that with the cover closed the pin of the crank means is above the axis of the rotatable shaft so that such rotation of the shaft imparts a pull on the link to open the cover; and a cover counterbalancing spring connected with said cover actuating means.

4. In a cooking appliance having an open topped receptacle provided with a cover therefor: means hingedly connecting the cover to the rear of the receptacle; a link hingedly connected to said cover hinging means and constrained by its connection thereto to pivotal motion about an axis spaced horizontally from but parallel to the hinge axis of the cover, said link extending substantially vertically across the rear wall of the receptacle so that a push and pull on the link effects opening and closing of the cover; an actuating shaft mounted in the lower portion of the receptacle and extending from front to back; a crank on the rear end of the shaft; an arm extended laterally from said link and slotted to receive the pin of the crank, so that rotation of the shaft to swing the crank upwardly or downwardly transmits cover opening and closing motion to the link, engagement of the crank pin with one end of the slot limiting rotation of the actuating shaft in a direction to close the cover; and a spring acting on said link in a direction tending to open the cover and holding the crank pin against said end of the slot, said end of the slot being so located that the crank pin moves slightly across dead center during closing of cover.

5. In a cooking appliance including an open topped receptacle having a rear wall and a cover for the receptacle: means hingedly mounting the cover from the rear wall; a link connected with the cover and operable to swing the cover between closed and open positions; a rod pivotally connected to said link; spaced bearings for the rod carried by the rear wall of the receptacle and guiding the rod for longitudinal motion; an abutment on said rod spaced from one of said bearings; a spring confined between said abutment and said bearing to yieldingly urge the rod in a cover closing direction; an actuating shaft extending through the lower portion of the receptacle from front to back; a crank on the rear end of the shaft; and an arm extending laterally from said spring rod and having a slot in which the pin of the crank is received so that actuation of the crank by rotation of the shaft transmits longitudinal axial movement to the rod.

6. In a cooking appliance including an open topped receptacle having a rear wall and a cover for the receptacle: means hingedly mounting the cover from the rear wall; a link connected with the cover and operable to swing the cover between closed and open positions; a rod pivotally connected to said link; spaced bearings for the rod carried by the rear wall of the receptacle and guiding the rod for longitudinal motion; an abutment on said rod spaced from one of said bearings; a spring confined between said abutment and said bearing to yieldingly urge the rod in a cover closing direction; an actuating shaft extending through the lower portion of the receptacle from front to back; a crank on the rear end of the shaft; and an arm extending laterally from said spring rod and having a slot in which the pin of the crank is received so that actuation of the crank by rotation of the shaft transmits longitudinal axial movement to the rod, one end of the slot engaging the crank pin to limit the cover closing motion of the actuating shaft and being so located with respect to the throw of the crank that the crank pin moves slightly across dead center in approaching said position to thereby oppose opening of the cover by the application of force directly thereon.

7. In a cooking appliance including an open topped receptacle having a cover therefor: means hingedly mounting the cover along one edge of the receptacle; a part connected with the cover and extending substantially horizontally beyond the axis of the cover hinge; a rotatable actuating shaft passing through the lower portion of the receptacle from front to back; a cover counterbalancing spring anchored at one end to the adjacent receptacle wall; a link pivotally connected to the cover projection at a point spaced horizontally from the hinge axis and extending substantially vertically towards the rear end of the actuating shaft; a crank on the rear end of the shaft having its pin connected to the link so that opening and closing of the cover may be effected by rotation of said actuating shaft; means on said link to which the opposite end of the cover counterbalancing spring is connected, and said link being substantially channel shaped in cross section and substantially embracing the counterbalancing spring to cover the same.

8. In a cooking appliance including an open topped receptacle having front and rear walls and a cover for the receptacle: means hingedly mounting the cover from the rear wall; projections extending from the rear wall having axially aligned holes providing spaced bearings; a rod slidable in said bearings and constrained thereby to longitudinal axial motion; an abutment on the rod between said bearings; a compression spring encircling the rod between the abutment and the upper one of said bearings; a link connecting the upper end of the rod with the cover outwardly of the axis of the cover hinge so that downward spring propelled motion of the rod transmits opening force to the cover; an actuating shaft extending through the lower portion of the receptacle from the front wall to the rear wall; means secured to the front end of the shaft for imparting rotation to the shaft; a crank fixed to the rear end of the shaft; and an arm fixed to the lower end of the rod and having a slot receiving the pin of the crank so that rotation of the shaft transmits endwise motion to the rod.

9. In a cooking appliance having an open topped receptacle provided with a cover therefor: a hinged cover support for the rear of the receptacle, said cover support having a medial wall; means on the cover support cooperating with the medial wall thereof to form guideways substantially parallel with said medial wall and substantially perpendicular to its hinge axis, the entrance to said guideways generally facing the rear edge of the cover; means for detachably securing the cover support to the cover including a part connectible with the cover and having portions fitting said guideways with a wedge-like action upon motion of said part relatively to the cover support in one direction, relative motion therebetween in the opposite direction effecting separation of said part from the cover support; and means pivotally connected with the cover support on an axis spaced from its hinge for imparting oscillatory movement to the cover support about its hinge axis to effect raising and lowering of the cover.

HERBERT J. MOON.
EMMET G. GARDNER.